Jan. 28, 1969   J. E. WISER ET AL   3,424,876
TIMER SWITCH HAVING A RAPID ADVANCE MECHANISM
Filed July 13, 1966

INVENTORS
JOSEPH E. WISER
ELMO W. VOLAND

ATTORNEY

United States Patent Office 3,424,876
Patented Jan. 28, 1969

3,424,876
TIMER SWITCH HAVING A RAPID ADVANCE MECHANISM
Joseph E. Wiser and Elmo W. Voland, Indianapolis, Ind., assignors to P.R. Mallory & Co. Inc., Indianapolis, Ind., a corporation of Delaware
Filed July 13, 1966, Ser. No. 564,878
U.S. Cl. 200—38       10 Claims
Int. Cl. H01h 7/08, 43/10

The present invention relates generally to a switch mechanism, and more particularly to a means and method of providing fast actuation of a switch mechanism using the rotational torque of the shaft of a motor.

Although the present invention is adaptable for use in a multiplicity of devices, a particularly useful application of the means and methods of the present invention is found in control timers such as sequential timers and the like employed to regulate cycle programs of electrical appliances such as washing machines, dishwashers, dryers, and the like. Generally, the sequential timers utilized to control the sequence of operation of the cooperatively associated electric appliance are of the type having a plurality of drum-like cams attached to a rotatably driven shaft. The drum-shaped cams have peripheral coded indicia, generally rise and fall contours, on which one or more follower switches ride. The state of actuation of any particular follower switch is determined by the contours of the drum-shaped cam cooperatively associated with the follower switch. Each follower switch effectively controls the state of actuation of an electrical circuit associated therewith. Such electrical circuits control the cycling of the electrical appliance.

Several of the prior art sequential timers are equipped with "rapid-advance" mechanisms which automatically locate the shaft carrying the drum-shaped cams in a predetermined position and hence position the follower switches riding thereon in determined state of actuation which corresponds to the desired starting point of the program cycle. The aforementioned feature permits the operator of the appliance to locate the desired starting point within the program quickly and efficiently without the necessity of waiting while the timer is rotated at its normal speed to the selected starting point within the cycle.

Several of the presently available sequential timers have line switch means cooperatively associated with the rapid advance mechanism which is biased to an opened condition when the rapid advance mechanism is activated to thereby terminate the flow of electrical current through the line switch to the follower switch means and the means cooperatively associated therewith. The termination of the flow of electrical current through the follower switches to the means associated therewith prevents premature and unnecessary actuation of said means thereby prolonging the life of said means and in addition allowing the program to be initiated substantially at its normal starting point. For example, if current was allowed to flow through the follower switches as said rapid advance mechanism was actuated, small amounts of water would flow into the wash tub thereby establishing a false starting point for the wash portion of the cycle program.

Several of the presently available sequential timers utilize a shaded pole motor to operate the gear train of the rapid advance mechanism. In general the shaded pole motor has its rotor axially displaced from the position of minimum reluctance with respect to the stator so that when the motor is activated by current flowing therethrough, the rotor is axially displaced with respect to the stator seeking the position of minimum reluctance. A line switch is placed in an interference path with said rotor so that the rotor engages with a movable contact thereof.

The axial displacement of the rotor causes said line switch to be biased to an open position thereby terminating the flow of current to the follower switches and the means cooperatively associated therewith. The utilization of the axial force of the rotor of the motor to actuate the line switch is at best relying on a limited force which may cause faulty actuation of the line switch. In addition, this type of device reduces the rotational torque of the motor because of the high amount of friction generated between the rotor and the movable contact of the line switch and requires a high axial throw force to actuate the line switch. The present invention does not require a high axial throw force but rather makes efficient and effective use of the rotational torque of the motor to obtain a fast and a positive actuation of the line switch, thereby leaving the throw force of the rotor to be applied to its major function of gear engagement.

Therefore, it is an object of the present invention to provide a motor actuated switch means which utilizes the rotational torque of the shaft to actuate a line switch means.

Another object of the present invention is to provide a motor actuated switch means wherein the switch has a follower arm that rides on the coded indicia of a means carried by the shaft of the motor, the coded indicia determining the state of actuation of the switch.

A further object of the present invention is to provide a motor actuated switch means wherein the follower arm of the switch means rides on a means carried by the shaft of motor that has a continuous rise contour substantially in the shape of a helical-spiral.

Still another object of the present invention is to provide a motor actuated switch means wherein the line switch means actuated by the rotational torque of the motor accomplishes the actuation function before the torque of the motor is required for gear actuation, thereby providing an efficient action.

Yet another object of the present invention is to provide a motor actuated switch means that deactivates the sequential timer during the positioning of the timer to the desired starting position.

A further object of the present invention is to provide a motor actuated switch means that is fast acting and requires a minimum amount of rotational torque for actuation and utilizes substantially all of the axial force of the rotor for displacement in preparation for gear engagement.

Still another object of the present invention is to provide a motor actuated switch means that is characterized by its simplicity of construction.

Another object of the present invention is to provide a motor actuated switch means that has optimum reliability characteristics afforded by compact construction having a minimum number of parts.

Yet another object of the present invention is to provide a motor actuated switch means that is efficient, effective and accurate.

A further object of the present invention is to provide a motor actuated switch means which can be readily fabricated and formed at low cost.

The present invention, in another of its aspects, relates to the novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description, appended claims, and appended drawing. The invention resides in the novel construction, combination, arrangement and cooperation of elements as hereinafter described and more particularly as defined in the appended claims.

The appended drawings illustrates an embodiment of the present invention constructed to function in the most advantageous modes devised for the practical application of the basic principals involved in the hereinafter described invention.

Figure 1:
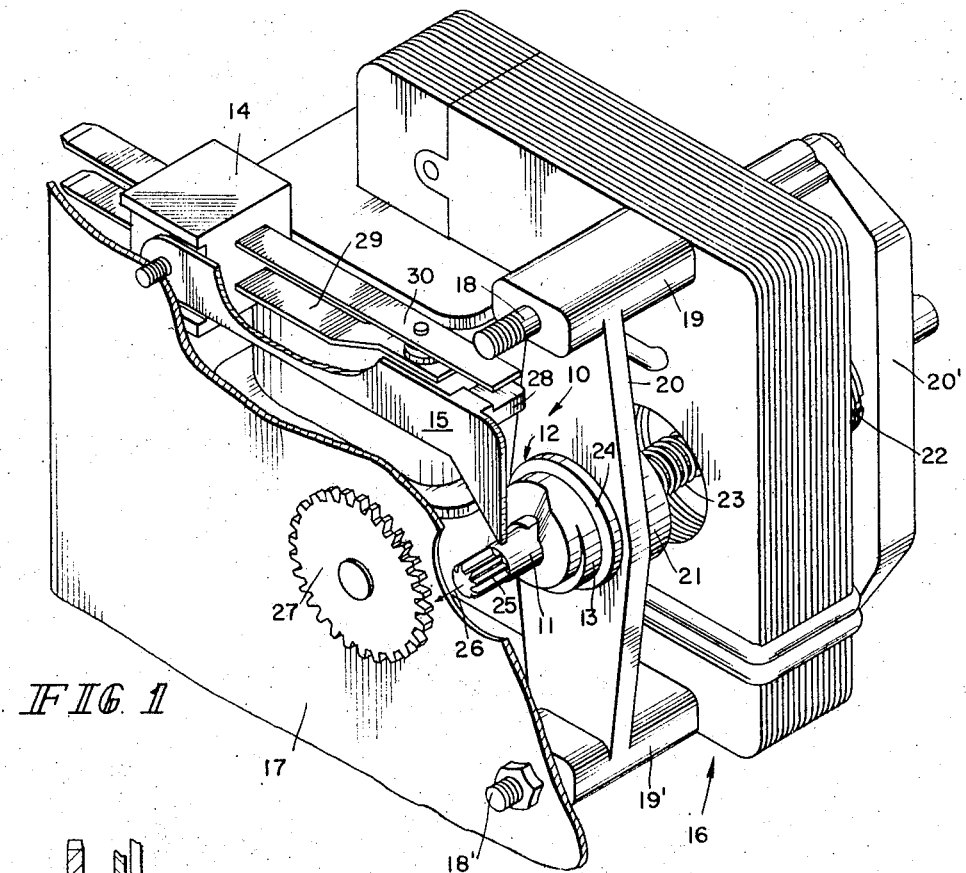
FIGURE 1 is a perspective view of the motor actuated switch means illustrating the several components thereof and the relative position of these components.

Generally speaking, the means and method of the present invention relate to a motor actuated switch means. The switch means includes a cam means fixedly connected to an axially displaceable shaft of a motor. The cam means has a continuous rise helical-spiral contour. A follower switch has normally engaged contact carrying blade means and follow means that normally ride on the periphery of the axially displaceable shaft. The follower means include lifter means. Energization of the motor axially and rotationally displaces the shaft causing the follower means to engage with and ride up the helical-spiral contour of the cam means without impeding the axial displacement of the shaft. The displacement of the follower means displaces the lifter means into engagement with one of the contact carrying blades and biases the blade such that the blades disengage thereby terminating the flow of electrical current through the switch. De-energization of the motor axially displaces the shaft back to its original position so that the follower means returns to its normal position of riding on the periphery of the shaft and the blades of the switch are engaged so as to allow electrical current to flow therethrough.

The motor actuated switch means is a component part of the sequential timer (not shown). Since the sequential timer may be of any suitable form, of which many are conventionally used, it has been omitted from the drawing in the interest of a clearer showing of the inventive portion of the present invention.

Figure 2:
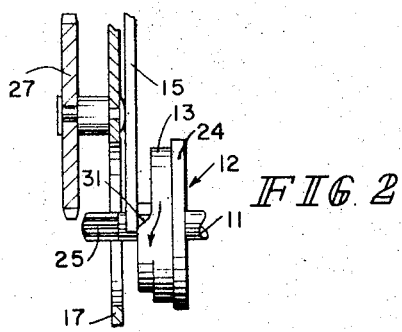
FIGURE 2 is a front view of the motor actuated switch means showing the helical-spiral contours of the cam means.
Figure 3:
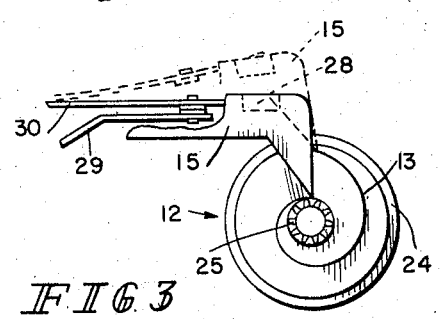
FIGURE 3 is a side view of the motor actuated switch means showing the follower arm of the line switch riding on the helical-spiral contours of the cam means illustrating the engaged and opened positions of the line switch in solid and dotted lines respectively.

Referring now to FIGURES 1-3 of the drawing and more particularly to FIGURE 1, the motor actuated switch means is generally indicated by the reference numeral 10. The switch means includes an axially displaceable cam carrying shaft 11, a cam 12 carried by the shaft and having coded indicia contours 13, and a control switch 14 including a follower arm 15 in close proximity to the cam and normally riding on the periphery of shaft 11.

A motor means 16 is fixedly connected by suitable fastening means 18 and 18' such as bolts and cooperating nuts and the like to front plate 17 of the sequential timer (not shown). The motor means illustrated in FIGURE 1 is a shaded pole motor, however, it will be understood that any suitable prime mover means may be used such as a synchronous motor and the like. The fastening means 18 and 18' includes a spacing means 19 and 19' which supports and maintains the stator portion of the motor means in substantially spaced parallel relationship with respect to the front plate. An apertured web means 20 extends between spacing means 19 and 19' and serves as a retaining and partial housing means for bearing housing 21 used to rotatably journal the cam carrying shaft 11. A second web means 20' is in spaced parallel relationship with the web means 20 and is used to rotatably journal a portion of the end of the cam carrying shaft in a manner similar to that of web 20.

The rotor 22 of the motor is biased toward web 20' by a helical spring means 23 wound around the cam carrying shaft and having one end biased against the bearing housing and the other end against the rotor of the motor in such a manner that in the normal position as illustrated in FIGURE 1 the spring means biases the rotor toward web 20'.

Cam 12 is fixedly connected to the shaft 11 by any suitable means such as by press fitting and the like. The cam includes coded indicia or cam track 13 that has a constant rise helical-spiral type of contour that is approximately 360 degrees in length. It will be understood that a slower or a faster rise may be designed on the cam by shortening or lengthening the length of the rise contour to a determined radial position. The apex of the rise contour is, of course, the maximum radial distance from the axis of the cam and extends 720 degrees around the periphery of the cam surface. The cam also includes a shoulder 24 that abuts the web 20 when the motor is de-activated or in its normal position.

The end of shaft 11 includes a pinion 25 which when displaced a predetermined axial distance in the direction of arrow 26 meshes with and rotatably drives gear 27. The gear 27 meshes with and rotatably drives another gear (not shown) of a gear train (not shown) which is part of the rapid advance mechanism (not shown) of the sequential timer (not shown).

A control switch or line switch 14 is fixedly connected to the front plate by any suitable fastening means such as bolts and nuts and the like. The line switch includes a follower arm 15 pivotaly coupled to the fastening means of the line switch to the front plate. The follower arm normaly rides on the periphery of the shaft 11 and in close proximity to the cam 12. The follower arm includes lifter means 28 that is integral with and has its major axis perpendicular to the major axis of the follower arm. The lower contact carrying blade 29 of the line switch is designed so as to terminate prior to falling within the arcuate path travelled by lifter means 28 as the lifter means is displaced from its normal position as the follower arm rides up the contour of the cam. The movable contact carrying blade 30 includes a contact that engages with the contact of blade 29 when the blades are in their normal or engaged position. Blades 29 and 30 are fabricated from any suitable resilient electrical conductive metal such as brass and the like. The contact carrying blade 30 has sufficient length so as to be in an interference path with the lifter means 28 of the follower arm as the follower arm is arcuately displaced when riding up the continuous rise contour of the cam means. As the follower means rides up the helical-spiral cam track of the cam means, the lifter means engages with the blade 30 and displaces the blade 30 so that the contacts of said blades disengage thereby terminating the flow of current through the switch.

With the hereinbefore structural disclosure in mind and by continued reference to the several figures of the drawing, the following analysis of the operation of the present invention will further serve to amplify the novelty of the present invention.

Upon energization of the shaded pole motor 16 by electrical current flowing therethrough, the rotor 22 begins to rotate at a high speed in the clockwise direction. As disclosed hereinbefore, the rotor is axially displaced from the stator a predetermined distance by helical spring means 23. Since the rotor is not at a position of minimum reluctance, with respect to the stator, the rotor seeks said minimum reluctance position while being rotationally displaced. In seeking the minimum reluctance position the rotor and its shaft are axially displaced in the direction of arrow 26 compressing the helical spring means between bearing housing 21 and the rotor thereby storing energy in the spring means. The axial displacement of the rotor axially displaces the shaft and the cam 12 carried by the shaft. Further axial displacement of the cam by the shaft causes the follower arm to engage with the continuous rise helical-spiral contour of the cam and in particular to engage with the lead-in 31 to the rise contour of the cam. The follower arm rides up said contour as said cam is continued to be axially displaced. The follower arm is arcuately displaced to the dotted line position shown in FIGURE 3 disengaging the contacts of the blades 29 thereby terminating current flow through the line switch. Axial displacement of the shaft continues until such time as the follower arm abuts the shoulder at which time the structure is so designed that the rotor is in a minimum reluctance position with respect to the stator. Also, in the aforementioned minimum reluctance position, the pinion of the shaft engages with and rotatably drives gear 27 of the gear train (not shown).

Upon cessation of current flow through the motor, the motor is deenergized thereby allowing the compressed helical spring means 23 to release its stored energy thereby returning the rotor and the shaft to its initial position as illustrated in FIGURE 1. As the shaft is displaced to its initial position, the pinion disengages the gear 27 and the cam disengages the follower arm allowing the resilient movable contact carrying blade 30 to return to its initial position, that is, engaged with contact carrying blade 29 thereby allowing current to flow through the line switch means.

Figure 4:
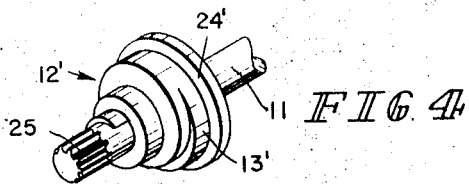
FIGURE 4 is a perspective view of the helical-spiral means having the constant rise path lengthened to about a revolution of the motor shaft.

The embodiment illustrated in FIGURE 4 illustrates a cam 12' fixedly connected to cam carrying shaft 11 having about a 360 degree rise helical-spiral cam track 13' and a shoulder 24'. The cam 12 illustrated in FIGURES 1–3 has about a 360° rise helical-spiral cam track. It is seen that a longer degree rise or even a shorter degree rise could be used than those illustated in the drawings. The longer cam track serves the purpose of lengthening the time required to open the line switch whereas a shorter cam track serves to shorten the time required to open the line switch assuming that the rotational speed of the shaft remains substantially constant.

Figure 5:
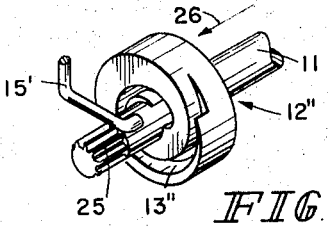
FIGURE 5 is an embodiment of the present invention illustrating a needle-like follower arm riding in a spiral groove cut in the major face of cam means and carried by the shaft of the motor.

The embodiment illustrated in FIGURE 5 shows a needle-type of follower arm 15' which rides in the spiral cam groove 13" cut into the front surface of the cam 12". The structural cooperation between the needle-type follower and the spiral cam groove 13" of the cam is substantially as described hereinbefore with the exception that the shaft 11 is momentarily retained in place as the needle follower arm traverses the length of the spiral cam track wheerupon the shaft is free to continue its axial displacement until the rotor reaches the position of minimum reluctance with respect to the stator.

While the invention is illustrated and described in embodiments, it will be understood that modifications and variations may be effected without departing from the scope of the novel concepts of this invention.

Having thus described our invention, we claim:

1. In a timer, motor means having an axially displaceable shaft and motor actuated switch means, said switch means fixedly connected to said shaft and including cam means having coded indicia contours, and follower switch means having follower means normally riding on the periphery of said shaft, energization of said motor axially and rotationally displacing said shaft, said axial displacement of said shaft causing said follower means to engage with and ride on said coded indicia contours of said cam means thereby actuating said switch in accordance with the contours of said cam means, de-energization of said motor axially displacing said shaft so that said follower means returns to said normal position of riding on said periphery of said shaft.

2. In a timer, a motor means having an axially displaceable shaft and motor actuated switch means according to claim 1, wherein said coded indicia contours of said cam is a continuous rise, helical-spiral contour.

3. In a timer, a motor means having an axially displaceable shaft and motor actuated switch means according to claim 1, wherein said coded indicia contours of said cam is a continuous rise, spiral contour.

4. In a timer, a motor means having an axially displaceable shaft and motor actuated switch means according to claim 1, wherein said motor is a shaded pole motor having rotor means axially displaced from the stator means by a bias means so that as said motor is energized, said rotor means is axially displaced to a position of minimum reluctance with respect to said stator.

5. In a timer, a motor means having an axially displaceable shaft and motor actuated switch means according to claim 4, wherein said bias means is a helical spring means wound around said shaft.

6. In a timer, a motor means having an axially displaceable shaft and motor actuated switch means according to claim 1, wherein said coded indicia contours of said cam is a continuous rise spiral groove cut in a face of said cam and said follower means is a needle-like follower arm that engages with said spiral groove as said cam means is axially displaced.

7. In a timer, a motor means having an axially displaceable shaft and motor actuated switch means according to claim 1, wherein said follower switch includes a follower arm having lifter means, a fixed contact carrying blade and a movable contact carrying blade normally engaged with said fixed contact carrying blade, said lifter means engaging with said movable blade as said follower means rides on said contours of said cam means thereby disengaging said blades.

8. In a timer, motor means having an axially displaceable shaft and motor actuated switch means, said switch means including cam means fixedly connected to said shaft and having a continuous rise helical-spiral contour and a follower switch having normally engaged contact carrying blades and follower means normally riding on the periphery of said shaft, said follower means including lifter means, energization of said motor axially and rotationally displacing said shaft, said follower means engaging with and riding up said helical-spiral contour without impeding axial displacement of said shaft, displacement of said follower means displacing said lifter into engagement with one of said contact carrying blades and biasing said blade so that said blades disengage, de-energization of said motor axially displacing said shaft so that said follower means returns to said normal position of riding on said periphery of said shaft and said blades are engaged.

9. In a timer, a motor means having an axially displaceable shaft and motor actuated switch means according to claim 8, wherein said motor is a shaded pole motor having rotor means axially displaced from the stator means by a bias means so that as said motor is energized, said rotor means is axially displaced to a position of minimum reluctance with respect to said stator.

10. In a timer, a motor means having an axially displaceable shaft and motor actuated switch means according to claim 9, wherein said bias means is a helical spring wound around said shaft.

References Cited

UNITED STATES PATENTS

| | | | |
|---|---|---|---|
| 1,189,651 | 7/1916 | Adsit | 200—38 |
| 2,906,328 | 9/1959 | Wantz | 200—38 |
| 3,372,597 | 3/1968 | Dotto | 200—38 |

ROBERT K. SCHAEFER, *Primary Examiner.*

H. O. JONES, *Assistant Examiner.*